United States Patent [19]

Abe et al.

[11] 4,413,900

[45] Nov. 8, 1983

[54] COPYING APPARATUS WITH SCANNING POSITION CONTROL

[75] Inventors: Shunichi Abe; Mitsuo Akiyama, both of Hachioji, Japan

[73] Assignee: Konishiroku Photo Industry Co., Ltd., Tokyo, Japan

[21] Appl. No.: 284,118

[22] Filed: Jul. 16, 1981

[30] Foreign Application Priority Data

Aug. 19, 1980 [JP] Japan .................................. 55-113642

[51] Int. Cl.³ .......................................... G03G 15/00
[52] U.S. Cl. ..................................... 355/8; 355/14 E; 355/14 R; 355/3 R
[58] Field of Search ...................... 355/8, 14 R, 50, 11, 355/53, 66, 49, 3 R, 14 E

[56] References Cited

U.S. PATENT DOCUMENTS

| | | | |
|---|---|---|---|
| 3,697,165 | 10/1972 | Morriston et al. | 355/8 |
| 3,918,806 | 11/1975 | Cook | 355/8 |
| 4,148,578 | 4/1979 | Bujese | 355/8 |
| 4,158,499 | 6/1979 | Hattori et al. | 355/8 |
| 4,159,173 | 6/1979 | Kasuga | 355/8 |
| 4,171,901 | 10/1979 | Takizawa et al. | 355/8 |
| 4,243,311 | 1/1981 | Tohyama et al. | 355/14 R X |
| 4,256,399 | 3/1981 | Ikeda | 355/8 |

*Primary Examiner*—A. C. Prescott
*Attorney, Agent, or Firm*—Jordan B. Bierman; Linda Bierman

[57] ABSTRACT

In an optical scanning system for a copying apparatus, it is known to reciprocate the equipment so that an image to be scanned is applied, for example, to a photosensitive drum, developed, and eventually applied to a recording medium. It is essential for each scanning cycle that the scanning function restart at the proper starting position. This objective is attained by the present invention which first moves the scanning equipment back to a position spaced from the initial starting position and only then completes the movement to the initial starting position. Strains on the equipment involved in an immediate forcible return to the initial starting position are thereby avoided.

3 Claims, 3 Drawing Figures

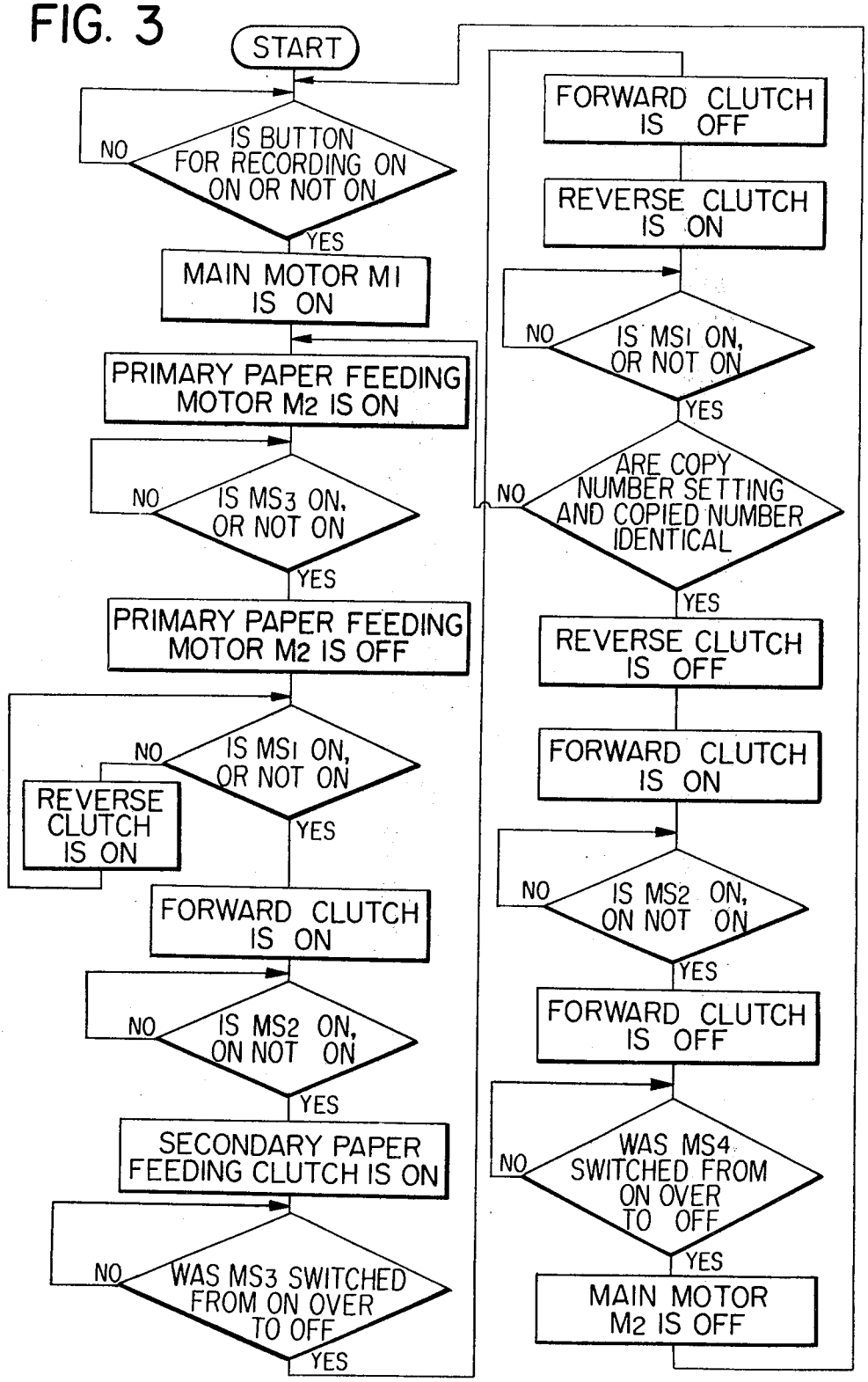

COPYING APPARATUS WITH SCANNING POSITION CONTROL

BACKGROUND OF THE INVENTION

1. Field of the Invention

The present invention relates to copying apparatus wherein the document glass plate or the optical scanning system is returned to the starting position before the start of copying.

2. Description of the Prior Art

As a copying apparatus, various types are known such as a mechanical optical one wherein exposure scanning is made while the light is applied to the original to be copied and the reflected light from the original is projected directly on the photosensitive member that is evenly charged, and thus an electrostatic latent image is formed on the photosensitive member; or an electro-optical one wherein an electric discharge is made between a dielectric and a means such as a multistylus electrode to be used after the reflected light from the original is converted to electrical image signals with the use of a solid state image sensor, and thus an electrostatic latent image is formed on the photosensitive member or on the dielectric member. In any one of them, an exposure scanning means namely a document glass plate or an optical scanning system (hereinafter called "a platen or the like") reciprocates in order to scan the original. A platen or the like, using a driving source, makes a forward movement through a forward clutch (a first driving means) and a backward movement by a reverse clutch (a second driving means), and is positioned at a fixed starting position before the start of the forward movement or after the completion of the backward movement.

The exposure action of such a platen or the like will be described with the reference of FIG. 1.

FIG. 1 shows a schematic view of a known copying apparatus. The top of the main frame 1 supports platen 2 on which the original M is placed. Optical scanning system 4 is arranged so that it reciprocates on the guide rod 3 extending horizontally within the main frame 1 and beneath platen 2. The optical scanning system 4 consists of a first movable stand 41 on the top of which the exposure lamp 41a for the original is fixed and inside of which the mirror 41b and the lens 41c are arranged, a secondary movable stand 42 on which the mirrors 42a and 42b are arranged and a mirror 43 attached to a part of the camera obscura 5. At the center in the main frame 1, the photosensitive member drum 6 is mounted for rotation in the direction of the arrow near the circumferential surface thereof, a charge generator 7, a developing device 8, a transfer electrode 9, a separation electrode 10, a change eliminating electrode 11 and cleaning device 12 are arranged successively. At the right side in the main frame 1, paper feeding device 13 is arranged and in this particular example, two types of recording paper in different sizes are loaded in the paper feeding cassettes 13a and 13b respectively and are set in the main frame 1. The numeral 13c indicates paper feeding rollers that feeds the recording paper loaded in the paper feeding cassettes up to the standby position A, and 13d are a pair of secondary paper registration rollers that convey the recording paper to the transfer position. The numeral 14 is a conveyance unit that conveys the recording paper after transfer to the fixing unit 15. The fixing unit 15 consists of a heater pressure roller 15a and a paper ejecting roller 15b. The numeral 16 is a paper receiving tray.

In the copying apparatus with the aforesaid structure, the microswitch MS1 for detecting the starting position and the microswitch MS2 located at a distance from MS1 for starting the paper registration rollers 13d are arranged near the left end of the guide rod 3 of the optical scanning system 4. At the input side of the paper registrating rollers 13d, a microswitch MS3 for detecting the recording paper is arranged, and at the input side of the paper ejecting roller 15b, the microswitch MS4 for detecting the exit of the recording paper is arranged. A shock-absorbing spring 17 is arranged around the guide rod 3 at the side of the first movable stand 41 on the second movable stand 42.

Before the start of recording operation, the optical scanning system 4 will be positioned at the starting position (the extreme left position on FIG. 1) and the microswitch MS1 for detecting the on start position is in the state. If, under such condition, the recording button SW (FIG. 2) is pressed, the main drive motor M1 starts rotating and after the microswitch MS1 is confirmed to be in the state of ON, a forward clutch CL1 (not illustrated) is energized to drive the optical scanning system 4 and the optical scanning system 4 is driven along the guide rod 3 and thus the scanning of an original is started. In the case that the microswitch MS1 is not in the ON state when the recording button is pressed, namely if the optical scanning system 4 is not in the start position, the reverse clutch CL2 (not illustrated) is energized and the optical scanning system 4 is returned to its start position, the microswitch MS1 is turned on and the reverse clutch is neutralized and the forward clutch is energized. Concurrently with the start of the forward movement of the optical scanning system 4, the recording paper is fed by the paper feeding roller 13c. With the microswitch MS3 is turned on, the paper feeding roller 13c is neutralized and the paper enters the state of standby at the position A where the paper hits the paper registration roller 13d. When the microswitch MS2 is turned on after certain period of time from the start of the movement of the optical scanning system 4, the paper registration rollers 13d are driven and the recording paper that has been in the state of standby is fed again toward the transfer position B. By doing like this, it is possible to make the leading edge of the recording paper coincide with the leading edge of the electrostatic latent image of the original formed on the photosensitive member drum 6 by the scanning of the original made by the optical scanning system 4. Thus, the optical scanning system 4 scans the original while it advances and the reflected light from the original is projected onto the photosensitive member drum 6 causing the formation of the electrostatic latent image of the original. On the other hand, the recording paper itself continues to be fed by the paper registration rollers 13d. later when microswitch MS3 is turned off after the trailing edge of the recording paper has passed completely by, the forward clutch that has been driving the optical scanning system 4 up to that time is deenergized and the reverse clutch is energized. At this moment, the optical scanning system 4 has completed the scanning of the original.

After movement of aforesaid optical scanning system, the optical scanning system 4 starts returning at higher speed than that of forward movement, and when the microswitch MS1 for detecting the start position is actuated, the reverse clutch is neutralized and the optical scanning system stops, compressing the shock-absorbing spring 17 that is a shock-absorbing means arranged around the guide rod 3, and it is possible that the optical scanning system 4 does not stop precisely at the start position due to the compression force of spring 17. If the optical scanning system 4 does not stop precisely at the start position, there arises the problem that the formation of an image will be started on the drum 6 before the illumination lamp or the like reaches its sufficient brightness in the next recording cycle because the optical scanning system will start from a position that is different from the regular start position. So, for the solution of this problem, the start position of the platen can be set at a position that is far behind the scanning zone, which, however, makes the total apparatus bulky. So, as a solution to solve this problem without making the total apparatus bulky considering the recent tendency toward compactness, there has been known a method wherein the reverse clutch is operated temporarily before the next recording cycle and the platen and the like are forcibly returned to the regular start position. In the case the platen and the like stop at the position far away from the regular position, if they are forcibly returned, they easily return to the regular start position due to the inertia of the platen and the like but in case they stop at a position slightly away from the regular start position, if they are attempted to be returned under force, they need a greater force than that of the case in which they stop at the position far away from the regular start position because of the strong reaction caused by the compression force of the spring; and the reverse clutch slips and slipping is generated between the pulley that transmits the power to the reverse clutch and the wire and thus the platen and the like sometimes do not return to the regular start position.

SUMMARY OF THE INVENTION

The present invention has been made in consideration of the above points so that the forward clutch is energized and the platen and the like are stopped at the position that is away from the start position by a predetermined distance when the platen and the like complete the scanning of the original, and they then are returned to the start position.

BRIEF DESCRIPTION OF THE DRAWINGS

FIG. 3 is a driving flow chart for the platen and the like of the present invention.

DETAILED DESCRIPTION OF THE PREFERRED EMBODIMENTS

Figure 1:
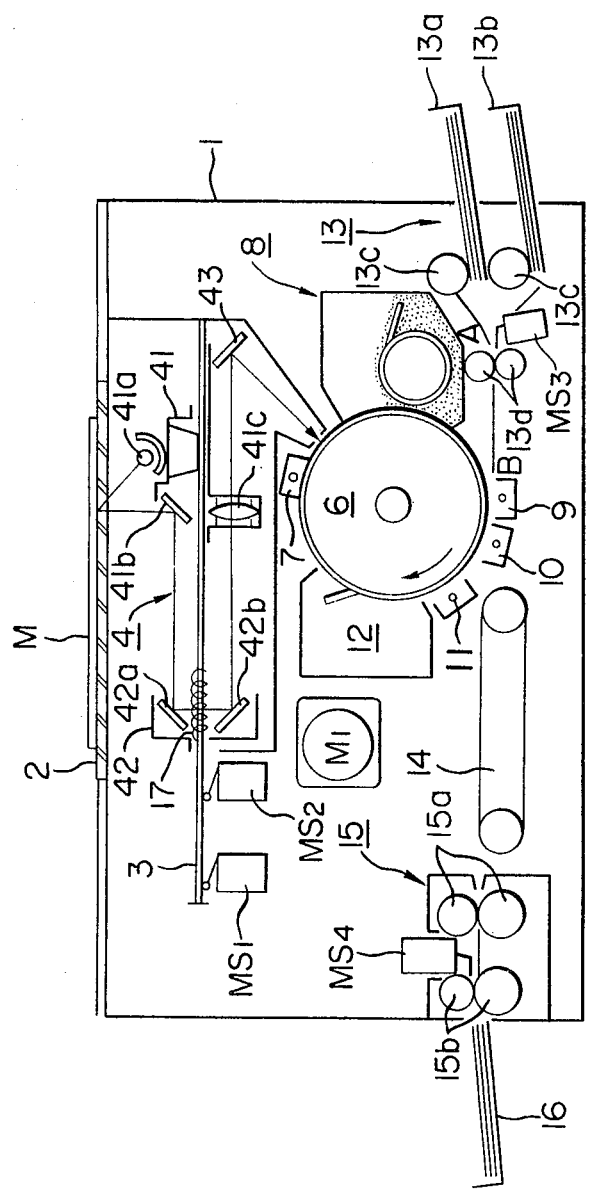
FIG. 1 is a schematic view of the copying apparatus both in conventional mode and the present invention mode.
Figure 2:
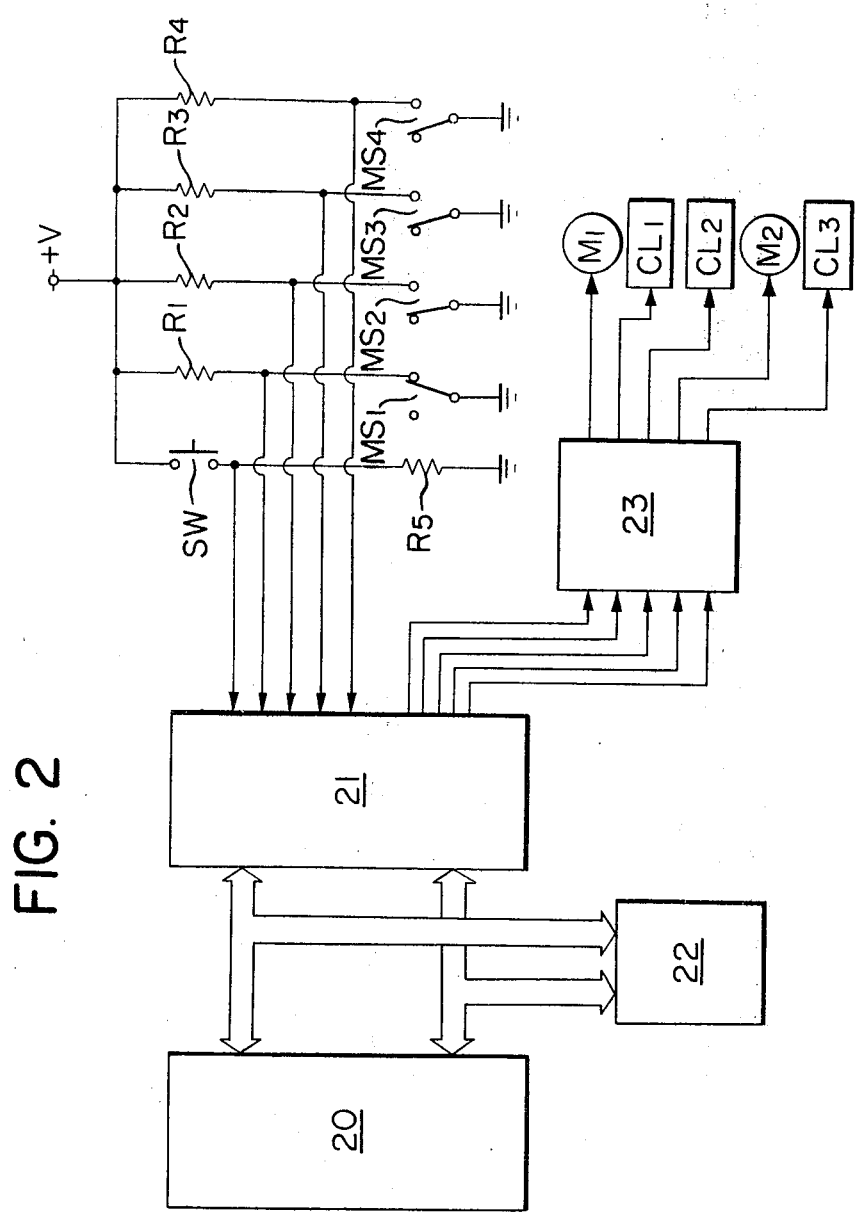
FIG. 2 is a control circuit of the driving mechanism for the platen and the like in the copying apparatus of the present invention.

The copying apparatus of the present invention is similar to the conventional copying apparatus shown in FIG. 1, with a control circuit to control the driving timing for the platen and the like thereof being shown in FIG. 2. In this figure, 20 is a central processing unit (CPU) such as, for example, Intel 8085 (made by Intel Company), 21 is an input/output device having a built-in memory (RAM) such as, for example, Intel 8155 (made by Intel Company) and 22 is a memory (EPROM) such as, for example, Intel 2716 (made by Intel Company). The aforesaid microswitches MS1, MS2, MS3 and MS4 are each connected in series with resistances R1, R2, R3 and R4 respectively and are connected in parallel between the power source (+V) and the ground together with the recording button switch SW to which the resistance R5 is connected in series, and signals either of H (High) level or of L (Low) level are derived from the points between each resistance and switch. From the input/output memory device 21, on the other hand, command signals are transmitted to the drive circuit 23 and based upon these command signals, the main motor M1, the forward clutch CL1 for driving the optical scanning system, the reverse clutch CL2 for driving the optical scanning system, the motor M2 for driving the paper feeding rollers 13c and the clutch CL3 for driving the paper registration rollers 13d are energized.

In the aforesaid control circuit, the microswitch MS1 for detecting the start position is normally in the ON state after the optical scanning system 4 is on the start position, the microswitch MS2 for starting the paper registration roller is in the ON state only after the optical scanning system 4 passes the same, and the microswitch MS3 for detecting the recording paper as well as the microswitch MS4 for detecting the exit of the recording paper are normally in the OFF state and are turned on when they are actuated by the recording paper.

The movements of the copying apparatus of the present invention will be described with the use of the flow chart in FIG. 3.

In FIG. 3, when the button for recording SW is pressed, the H level signals are feld to the input/output device 21 and according to the program stored in the memory 22 in advance, the command to start the main motor M1 and the motor M2 for driving the paper feeding roller is transmitted from the input/output device 21 to the drive circuit 23 and thus these motors M1 and M2 start rotating. Consequently, the recording paper is fed from a cassette to the standby position A by one of the paper feeding rollers 13c and if the leading edge of the recording paper actuates the microswitch MS3, H level signals are given to the input/output device 21 and the command to stop a paper feeding roller 13c is transmitted from the input/output device 21 to the drive circuit 23. Here, if the optical scanning system 4 is in the start position, the microswitch MS1 is in the ON state and therefore, the forward clutch is energized by the command transmitted from the input/output device 21 to the drive circuit 23; then the optical scanning system 4 starts moving and thus it starts scanning. Thereafter, when the microswitch MS2 is turned on by the optical scanning system 4, the H level signals are fed to the input/output device 21 and therefore, the command to energize the clutch CL3 for paper registration roller is transmitted from the input/out device 21 to the drive circuit 23 causing the paper registration rollers 13d to feed the recording paper in the standby state toward the transfer position. If the trailing edge of the recording paper leaves the microswitch MS3 after being fed, the microswitch MS3 returns to the OFF state. The L level signals then are fed to the input/output device 21 and therefore the drive circuit 23 deenergizes the forward clutch CL1 and the paper registration rollers 13d, and energizes the reverse clutch CL2 upon command from the input/output device 21. Consequently, the optical scanning system 4 starts returning. The returning speed at this time is made higher than that for original scanning to obtain higher copying speed.

Thus, the optical scanning system 4 approaches and then arives at the start position, compressing the shock-absorbing spring 17 and, actuates the microswitch MS1, when the reverse clutch CL2 is deenergized and at the same time the forward clutch CL2 is energized. Consequently, the optical scanning system 4 is driven and again starts moving toward the scanning direction, and when the microswitch MS2 is actuated immediately after the moving, the forward clutch CL1 is deenergized. Only at this time, the optical scanning system 4 stops. Stopping the optical scanning system at a slightly advanced position by shifting purposely with the forward clutch CL1 in place of the stop position by the conventional repulsive force of the spring 17 makes it easy to compress the spring 17 with the aid of the inertia caused by the purposely shifted distance that serves as an approach for returning when the reverse clutch is energized before the next recording cycle, and the optical scanning system 4 tries to return to its start position, and thus the optical scanning system can easily return to its start position. Incidentally, when the optical scanning system 4 returns to its start position at the end of the recording cycle and the microswitch MS1 is turned on, CPU 20 judges whether the set number of copies is equal to the actual number of copies or not. In this example, the actual number of copies is counted when the microswitch MS1 is turned on by the optical scanning system at the end of the recording cycle.

In the example mentioned above, the optical scanning system is moved in order to scan the original, but the copying apparatus of the type wherein the platen is moved is a situation that is exactly the same. Further, there has been described a method wherein the forward clutch is deenergized when the microswitch MS2 is turned on after the forward clutch is energized temporarily in order to provide an approach when the optical scanning system returns to its start position at the end of the recording cycle, but it is not necessarily limited to this method, and the forward clutch may be deenergized a certain period of time after the microswitch MS1 for detecting the start position is actuated, or pulses may be picked up from the rotation of the photosensitive member drum and the forward clutch may be deenergized when a fixed number of pulses are detected after the microswitch MS1 is actuated.

With the present invention, as described above, the platen and the like always stop at of a certain distance from the start position on the copying apparatus having a shock-absorbing means near the start position of the platen, because the forward clutch is energized when the platen and the like return to the start position and then it is deenergized when a certain period of time has passed thereafter. Therefore, when the platen and the like are returned to the start position before the next recording cycle, the returning is made easy because an approach is provided and they return to the start position accurately; it therefore is possible to eliminate the slips between pulleys in the driving mechanism for the platen and the like and wires and to eliminate slipping of the clutches.

What is claimed is:

1. In a copying apparatus in which an exposure scanning means is cyclically moved forward from an end position by a first driving means and then is moved backward toward its starting position by a second driving means, and resilient shock-absorbing means catches said scanning means on its return from its end position to its starting position, the combination of control means energizing said first driving means for a predetermined time period after said scanning means has been stopped in its backward movement by said shock-absorbing means at a predetermined distance removed from the initial starting position, and further means operative after a predetermined time for energizing said second driving means to return said scanning means to its initial starting position.

2. In a copying apparatus according to claim 1, in which said control means includes a first microswitch positioned at said starting position and operative by said scanning means when in its starting position, and a second microswitch spaced in the forward direction from said first microswitch and actuated by said scanning means after movement from its starting position.

3. In a copying apparatus according to claim 2, in which said control means includes an input/output device responsive to the opening and closing of said microswitches, and in which upon return of said scanning means to its starting position said input/output device energizes said first driving means in response to the closing of said first microswitch, and deenergizes said first driving means in response to closing of said second microswitch.

* * * * *